Patented July 7, 1942

2,288,874

UNITED STATES PATENT OFFICE 2,288,874

CONVERSION OF HYDROCARBONS WITH SILICEOUS CATALYSTS

John A. Anderson and Edmond L. d'Ouville, Chicago, Ill., assignors to Standard Oil Company, Chicago, Ill., a corporation of Indiana No Drawing. Application December 30, 1939, Serial No. 311,947

26 Claims. (Cl. 196—52)

This invention relates to the conversion of hydrocarbons with catalysts and more particularly to the manufacture of a catalyst suitable for the conversion of hydrocarbons at elevated temperature. The conversion of hydrocarbons includes the cracking of heavy hydrocarbon oils, preferably in the vapor phase, to produce gasoline motor fuel; the viscosity breaking of heavy oils; the reforming of gasoline and naphthas, more particularly heavy naphthas boiling in the upper gasoline boiling range and somewhat above; dehydrogenation of naphthas, especially light naphthas boiling in the range of hexane and octane; gas reversion or the simultaneous conversion and combination of fixed hydrocarbon gases and hydrocarbon oils, and similar operations wherein hydrocarbon oils are subjected to the action of a catalyst at elevated conversion temperatures whereby the carbon skeleton of the hydrocarbons is disrupted or rearranged. The temperatures employed are generally in the range of about 700 to about 1100° F., depending on the particular type of operation to which the catalyst is applied. Cracking of heavy oils such as gas oil is usually effected with the catalyst at temperatures of about 850 to 975° F., whereas naphtha reforming may be carried out at temperatures within the range of about 950 to 1050° F.

One object of the invention is to produce a hydrocarbon conversion catalyst of high efficiency from readily available water-insoluble silicate minerals, artificial silicates, steel mill slags, cement mill wastes, etc. Another object of the invention is to produce from cheap, readily available materials, hydrocarbon conversion catalysts which will withstand higher temperatures during regeneration than the catalysts which have heretofore been produced by activating natural products such as clays. A further object of the invention is to produce cheaply from certain water-insoluble silicates, hydrocarbon conversion catalysts of high activity and long catalyst life. Still another object of our invention is to effect the cracking of gas oils into gasoline with the minimum production of by-product gas and carbon by contacting the vapors of the gas oil under controlled temperature conditions with a catalyst obtained from the decomposition of fused silicates with acids.

By our invention we propose to convert water-insoluble metal silicate materials into porous catalysts for hydrocarbon conversion by powdering the silicate, disintegrating with acid and finishing by conventional washing and drying steps. We prefer to use water-insoluble silicates which are disintegrable with acid without preliminary heat treatment or fusion with basic oxides. However, some of the silicate materials which we propose to use as starting materials require initial processing such as fusion or fluxing with a metallic oxide such as lime in order to render the silicate amenable to attack and solution by acid.

To carry out our invention, we employ as a starting material certain silicates or mixtures of silicates, natural or artificial, which contain in their composition catalytically activating metals selected chiefly from groups III, IV, V, VI and VIII of the periodic system of elements. Typical of these activating metals are boron, aluminum, zirconium, cerium, thorium, vanadium, chromium, molybdenum, cobalt, and nickel. These activating metals are usually present in the form of their silicates in the starting material which may be composed principally of calcium, or magnesium silicates or compounds thereof. However, catalytically activating metals may be added at a later stage in the preparation of our catalyst from silicates. Of the catalytically activating metals mentioned, we prefer to employ aluminum because of its ready availability and its satisfactory catalytic activity, especially in catalysts employed for the cracking of hydrocarbon oils. We have also found magnesium to exhibit pronounced activating effects.

It is important that the silicate material employed in our process contain sufficient basic materials to render the silicate disintegrable by acid. By basic materials we intend to include calcium oxide, iron oxide, magnesium oxide, manganese oxide, barium oxide, and in particular the alkaline earth compounds. In general, we employ as bases all those compounds of metals whose oxides dissolve in or react readily with ordinary acids, such as hydrochloric or sulfuric acids, even after fusion. We avoid the use or presence of the alkali metals as we have found them to be objectionable in the finished cracking catalyst and their removal is often troublesome. However, small amounts of alkali metals may be present, e. g., 2 to 10% in the raw materials, but they must be washed out of the catalyst later in the preparation. Potassium and sodium are the alkali metals usually encountered.

In order to obtain satisfactory disintegration of the silicate employed in our process, we prefer to use silicates containing about 20 to 50% $SiO_2$, although in the case of certain silicates, a larger amount of $SiO_2$ may be present. Thus, in the case of magnesium silicate or talc, the amount of SiO₂ permissible may be about 64%, yet satisfactory disintegration may be obtained after the talc has been fused. In the case of zirconium silicate or zircon, however, the amount of SiO₂ present is only 33%, yet the mineral is not disintegrated by acid until it has been fused with calcium oxide or other base. Those silicates containing a high percentage of the alkali earth metals will, in general, disintegrate in acid if the SiO₂ content does not exceed 55%. However, those silicates which contain a high percentage of silicon dioxide, such as pumice, beryl, kaolinite, orthoclase, microcline, plagioclases higher than 47% SiO₂, coal ash and volcanic ash require fusion with basic oxide to make the same disintegrable with acid.

Another example of the effect of the silica composition on the disintegrability of the silicate in acid is illustrated by a feldspar, a potassium-aluminum silicate containing about 65% of SiO₂, the ratio of base metal to SiO₂ being 4 chemical equivalents of base metal to 3 SiO₂. This feldspar is not disintegrated by acid but when 3 parts of the feldspar are fused with 1 part of calcium oxide, the resulting silicate, containing about 49 to 52% of SiO₂, may be disintegrated with hydrochloric acid. We have found that in general those silicates which contain 2 or more chemical equivalents of readily soluble base metal oxide for each SiO₂, may be disintegrated. Where the metal combined with the silicate is amphoteric, such as aluminum or zirconium, a higher proportion of base is necessary. Where the amount of SiO₂ in the silicate is too high, as in the case of the feldspar, just cited, the silicate may be fused with additional base such as calcium or magnesium oxides or carbonates, or with a basic silicate or slag. Thus we may fuse together a silicate of low silica content with a silicate of high silica content to obtain a material which is satisfactorily disintegrable by acid. Fusion usually requires a temperature upwards of 1000° C., in some cases as high as 1500 to 2000° C. Silicates containing less than 20% SiO₂ in the composition, for example, 10% SiO₂, may be readily dissolved by the acid, but, in general, the yield of catalyst resulting from these silicates is too low to make their use economic.

An important characteristic of the silicate materials which we employ is that they are water-insoluble, thus distinguishing them from the alkali metal silicates such as sodium silicate. The basic constituents preferred are the alkali earth metals, especially calcium and magnesium. The following are typical examples of natural silicates which we may employ. The formulas are, of course, approximate and often do not indicate the presence of activating elements as aluminum, magnesium, manganese, cobalt, etc.

| Formula | Mineral |
|---|---|
| $(LiKNa)_2((AlFe)OHF)_2(SiO_3)_3$ | lepidolite (mica) |
| $NaAlSiO_4$ | nephelite |
| $CaAl_2(SiO_4)_2$ | anorthite |
| $MgFeSiO_4$ | olivine |
| $Zn_2SiO_4$ | willemite |
| $H_4Mg_3Si_2O_9$ | serpentine |
| $CaSiO_3$ | wollastonite |
| $Ca_3Al_2(SiO_4)_3$ | hessonite |
| $Mn_3Al_2(SiO_4)_3$ | spessartite |
| $Ca_3Fe_2(SiO_4)_3$ | melanite |
| $Ca_2Al_3(OH)(SiO_4)_3$ | epidote |
| $H_2Mg_3(SiO_3)_4$ | talc |
| $CaTiSiO_5$ | sphene |

Some of the above minerals may be disintegrated directly by treatment with acid while others must be first fused or sintered. Of the latter class are lepidolite, hessonite, spessartite, melanite, epidote and talc.

In addition to the above silicates, we may employ certain commercial products and by-products of fusion operation which meet the requirements of the silicates set out above. Among these are glasses, slags, blast furnace slag from steel smelting operations, metallurgical slags from lead, zinc and copper, ferrosilicon smelting, etc., basic and acid open hearth furnace slags, Bessemer process and Aston process slags, mineral wool, slag wool, Portland cement, etc. Blast furnace and open hearth slags usually have about the following analysis:

| Blast furance | | Basic open hearth | | Acid open hearth | |
|---|---|---|---|---|---|
| | Percent | | Percent | | Percent |
| Silica | 25–40 | Silica | 10–15 | SiO₂ | 49–52 |
| Alumina | 10–15 | Iron oxide | 10–18 | FeO | 20–35 |
| Magnesia | 5–25 | CaO, MgO | 45–55 | MnO | 12–20 |
| Lime | 20–50 | P₂O₅ | 5–15 | | |

Traces of iron, manganese, potash, soda, sulfur and phosphorus are also present. The calcium content is usually between 5 and 40%. In the case of the blast furnace slag the silica and alumina contents may vary from the figures stated and silica may reach 55% in some cases. Alumina may be as low as 5% or less and yet produce a slag suitable for our process. We prefer to employ silicate materials which are of uniform, homogeneous composition in order that the acid may act uniformly on all parts of the material. Uniformly fused silicates are, therefore, advantageous. When fusing silicates, we may add desired activating metal oxides or silicates, etc. to the fusion. Thus we may add zircon to a silicate fusion to supply zirconium, bauxite to supply aluminum, or beryl to supply beryllium. Monazite may also be added to supply the rare earth elements, including thorium, when desired.

In carrying out our process of making hydrocarbon conversion catalysts from water-insoluble silicates, we prefer to grind or otherwise reduce the silicate or mixture of silicates to a fine powder in order that it may be more readily attacked by the acid used in the disintegration step of the process. Thus, we may reduce the silicate material to about 50 or 100 mesh and in some cases even to 150 or 300 mesh. If no large particles are present, complete solution in acid will take place in a short time. If large particles are present they may not be completely disintegrated or dissolved and will remain in the finished catalyst product or, if desired, they may be separated in a separate step as hereinafter described. The powder is then treated with a solution of a strong acid, such as hydrochloric, sulfuric, sulfamic, oxalic, phosphoric or nitric acid. For example, the powdered silicate can be slurried with water and added gradually to the acid solution or the powdered silicate may be slurried with a large amount of water and the acid added. The powdered silicate may also be added dry to the acid solution.

In a typical example, we may treat the silicate with hydrochloric acid at a concentration of 15 to 20% HCl adding about 1 part of silicate to about 5 parts by weight of the acid solution. The treatment may be conducted at ordinary temperature, which usually requires cooling to remove the heat of reaction. In general, however, we find it desirable to carry out the treatment at somewhat elevated temperature, for example, 80 to 150° C., but preferably at the boiling point of the acid, about 110° C., in the case of 17%

HCl. Thus, whereas the treatment may require several hours or days at ordinary temperature, disintegration of the silicate may be complete within 5 minutes to an hour at the elevated temperature attained by allowing the reaction to proceed normally without cooling.

By controlling the concentration and the quantity of the acid used, the strength of the catalyst may be improved. In a typical example 100 grams of powdered blast furnace slag silicate previously moistened were disintegrated with a solution of 250 ml. 35% hydrochloric acid dissolved in 1700 ml. of water. The yield of catalyst after coagulation, washing and drying was 40 grams. If much less acid is used, the silicate will not be completely disintegrated. Also, if much less water is used the catalyst obtained will have a lower density and will be generally physically weaker. The use of more water increases the cost of evaporation and drying. The concentration may be increased, for example, to 100 grams of silicate for each 800 ml. of water, but in that case, it is desirable to allow the gelled catalyst to age for several hours to several days before washing in order to increase the physical strength of the resulting catalyst. When sulfuric acid is used, we have found that 100 grams of concentrated sulfuric acid diluted to approximately 2 liters is sufficient to disintegrate 100 grams of powdered silicate. This ratio of acid to silicate will need to be varied somewhat, due to differences in the composition of different silicates and in general the amount of acid necessary must be increased in proportion to the base content of the silicate. When phosphoric acid is used in the proportion of about 200 grams or more of acid to 100 grams of silicate, precipitation of calcium phosphate may be largely avoided.

Where the silicate material is sufficiently finely ground, it will pass completely into solution in the acid giving a colloidal silica sol together with salts of other elements present, such as calcium, magnesium, aluminum, iron, manganese, etc. Thus, in the treatment of blast furnace slag with hydrochloric acid, calcium and aluminum chlorides are present with the silica sol. In the case where, because of insufficient grinding or non-uniformity, some of the silicate remains undissolved in the acid, it may be separated from the solution by filtration or decantation. Dirt and inert matter, such as carbon, sand, etc., may be also removed in this way. To facilitate this separation, if desired, the solution may be stabilized in various ways, as by strong cooling, adding alcohol or other stabilizers. In either case, the solution is allowed to coagulate in the form of a gel. Coagulation may be accelerated by evaporating the solution to remove water, by heating, boiling, or by adding coagulants, such as phosphoric acid or neutralizing agents, such as ammonium hydroxide, calcium hydroxide, sodium acetate, sodium silicate, etc. to adjust the hydrogen ion concentration. By carefully controlling the hydrogen ion concentration during gelation, a stronger catalyst is obtained.

In another embodiment of our invention, we bring about an increased or complete retention of the activating metal by adding a neutralizing agent after disintegration is complete. Where a neutralizing agent is used, it is generally desirable to add an amount only sufficient to reduce the acidity without completely neutralizing the acid. Thus, the acidity of the disintegrated silicate solution may be reduced to a pH of about 1 to 5. When sodium silicate is employed as a neutralizing agent, silica is produced and combines with the catalytic substance from the silicate mineral. In some cases, it is desirable to carry the neutralization beyond a pH of 5 and thereby precipitate a portion of the basic elements present. Thus, sufficient ammonia may be added to bring about the precipitation of some aluminum hydroxide and thus increase the amount of alumina in the coagulated catalyst. After coagulation, the gelatinous mass is broken up and washed with a copious quantity of water to remove excess acid and/or soluble salts, or the washing step may be deferred until after initially drying or partially drying. In some cases it may be desirable to leave some metallic salt in the catalyst and then calcine to drive out the salt, if volatile, or to convert the salt to metallic oxide.

After washing, the gel is dried and crushed to the desired size or pelleted, for use in the hydrocarbon conversion system. The catalyst may also be powdered and contacted with oil vapors in suspension. After using the catalyst for the conversion of oil, it becomes deactivated chiefly as the result of carbon deposition and it may then be reactivated by burning with air or a mixture of air and inert gas, care being taken to prevent excessive temperatures during regeneration which have been found to permanently impair catalyst activity. Generally, the regeneration temperature should be kept below about 1100° F., although in some cases temperatures as high as 1400° F. may be tolerated without serious damage to the catalyst. We have found that our disintegrated silicate catalysts are unusually hardy in this respect, especially those in which the activating elements are zirconium, titanium and the 6th group metals.

The amount of acid used will depend upon the kind and amount of basic material present in the silicate. In general, the amount of acid used should be in excess of that required to convert the basic oxides to salts. The amount of excess should be such that the reaction mixture is distinctly acid even after the complete disintegration of the silicate. This excess is desirable both to enhance the rate of disintegration and to improve the physical properties of the catalyst. We prefer to use a stoichiometric excess of acid of 2% to 50%. In cases where subsequent neutralization with sodium silicate is intended, the amount of excess acid will depend upon the desired ratio of activating metal to silica in the catalyst and may be several hundred percent. On the other hand, where neutralization with lime or ammonia is anticipated, we prefer to use a minimum excess of acid.

As indicated hereinabove, we may use various acids for decomposing the silicate. When sulfuric acid or phosphoric acid is employed, for example, 10 to 25% concentration of sulfuric acid, a major portion of the calcium contained in the silicate is converted into the insoluble sulfate or phosphate. We have found by actual tests in the conversion of hydrocarbon oils that the presence of calcium sulfate in the catalyst may confer certain valuable properties. Thus, we have found that in some cases the calcium sulfate increases the physical strength of the catalyst and also may increase the catalyst life by inhibiting the deposition of carbon. The amount of calcium sulfate in the catalyst may be controlled by regulating the amount of $H_2SO_4$ used in disintegration of the silicate, completing the disintegration with HCl or other acid.

If it is desired, however, to eliminate the calcium sulfate from the catalyst, this may be readily accomplished by filtering or decanting the disintegrated solution obtained from the disintegration of the silicate before gelation has occurred. The time required for gelation depends on a variety of conditions and will ordinarily be between one hour and one day. Gelation, however, may be inhibited or slowed down in several ways, for example, by adding alcohol or by cooling the solution, thereby facilitating the separation of calcium sulfate and/or other insoluble substances.

Because of its complex nature, the analysis of the catalyst obtained by our process is not easy. One analysis gave the following results:

| | Per cent |
|---|---|
| $SiO_2$ | 85.24 |
| $Al_2O_3$ | 2.05 |
| CaO | 1.71 |
| Mg | Trace |
| P | Trace |
| $H_2O$ | 10.9 |

This analysis shows over 10% water of hydration which was driven off on heating to 750° F.

In general, the amount of activating metal in the catalyst, chiefly aluminum in this case, is small in comparison to the silica content and may be within the range of about 0.05 to 10%. Usually, the amount of activating metal present is about 0.5 to 2%, although in the case where neutralization methods are used during preparation of the catalyst, the amount of activating metal, for example, alumina, will be somewhat higher, for example, 5% to 8%. If the gelled silicate is washed with hot water, the amount of alumina or other activating element left in the catalyst may be increased, probably because of increased hydrolysis of the aluminum salts present.

The silica content is correspondingly high, usually about 80% or 90% and sometimes as high as 95% to 98%, except in the case where calcium sulfate, barium sulfate or other insoluble salt is present, in which case, the silica content may be as low as 50% or less, as previously indicated. Other catalytically activating elements may be added to the catalyst by adding their salts or oxides to the silicate either before or after disintegration. Thus, chromium, molybdenum, vanadium, manganese, cobalt, nickel, copper or thorium oxide may be added to the silicate in amounts of 0.05 to 3%, more or less. If oxides, hydroxides, or other insoluble compound of the activating element are employed, they should be thoroughly mixed with the gelled silicate or the finished silicate catalyst by grinding.

We may also modify our catalyst material by applying to it other catalytic metals after the material has been coagulated and washed, either before or after drying. Thus, we may apply to the coagulated and washed catalyst, solutions of certain activating metals as ammonium molybdate, chromic acid, nickel nitrate, etc. The resulting product is then dried and heated to an elevated temperature to decompose the activating metal compounds. We may also intimately mix our catalyst with oxides, hydroxides, etc. of the activating metals, such as aluminum, titanium, magnesium, chromium, etc.

The following examples illustrate the conversion of hydrocarbon oil with our silicate catalysts. The conditions given are typical but may be varied widely. Thus the space velocity may be varied from 0.1 to 10, generally depending on the pressure and temperature. The higher the temperature in general, the higher the space velocity which may be employed.

*Example I*

A Mid-Continent gas oil of 35° A. P. I. was vaporized and passed over a catalyst prepared from the treatment of blast furnace slag silicate by the method hereinabove set forth, using HCl to disintegrate the silicate. The catalyst had an apparent density of only 0.22. The results are shown in the following table:

| | | |
|---|---|---|
| Temperature | °F | 925 |
| Space velocity | | 1.00 |
| Run time | hrs | 5.0 |
| Yields: | | |
| Gasoline | volume percent | 19.88 |
| Gas | weight percent | 3.61 |
| Lbs. of gas/gal. gasoline | | 1.28 |
| Gravity of gasoline | °A. P. I. | 60.6 |
| Boiling range of gasoline —°F. | | |
| Initial | | 76 |
| 10 | percent | 133 |
| 50 | do | 244 |
| End point | | 412 |
| Specific gravity of gas (air=1) | | 0.83 |
| Carbon on catalyst, percent of oil charged | | 0.61 |
| Octane number of gasoline by blending method—C. F. R. M. | | 97.7 |

The space velocity is the volume of liquid oil charged per volume of catalyst per hour, the volume of catalyst being the total volume occupied by the catalyst, sometimes called the "apparent volume." It will be noted from the above data that the gasoline obtained possessed a very high knock rating as indicated by the blending octane number of 97.7. This octane number was determined by blending 20% of the product in a commercial gasoline of approximately 70 octane number C. F. R. M.

*Example II*

The catalyst was made by fusing talc at a temperature above about 1300° C. This silicate mineral is also known as steatite and soapstone in massive form. After cooling, the fused mineral was ground to a powder. One hundred fifty parts of the powder were added to a solution of 375 parts of concentrated HCl in 2875 parts of water. After stirring at 200° F. for 10 minutes the solution was filtered to remove some undissolved matter and evaporated to 1700 parts. On standing, the filtrate coagulated to a solid gel and this was broken up and washed substantially free of acid. It was dried at 300° F., steamed and washed again with more water and dried again at 300° F. The yield of catalyst was 33% of the powdered fused silicate. It was screened to a size of 6 to 24 mesh, very little finer material being produced. The catalyst was used for cracking 35° A. P. I. Mid-Continent gas oil at a temperature of 925° F., regenerated and used again for cracking. The space velocities were 1.07 and 0.87 volumes per volume per hour, respectively, and the duration of each run was 5 hours. The following results were obtained:

| | New catalyst | Regenerated |
|---|---|---|
| Gasoline, 400° F. end point—yield percent | 16.6 | 18.7 |
| Gas, weight do | 4.8 | 2.0 |
| Carbon do | 0.23 | 0.31 |
| Specific gravity of gas | 0.86 | 0.79 |
| Knock rating of gasoline, A. S. T. M. | | 76.0 |

Example III

Some feldspars cannot be disintegrated by acid even after fusion. Accordingly, 500 parts of unslaked lime were fused at a temperature above about 1200° C. with 750 parts of such a feldspar. The fused product, 700 parts, was powdered and added to 1500 parts of concentrated HCl in 12,000 parts of water. The mixture was stirred for about 15 minutes, filtered and the filtrate evaporated to about 8000 parts. The solution solidified at this point and after standing several hours to stiffen, it was washed with water until no acid remained. The solid product was finally dried at 300° F. The catalyst was a white, opalescent material of glassy appearance, having an apparent density of 0.58. The yield was 51% by weight of the feldspar employed. The catalyst was graded to a size of 6 to 24 mesh, only 7% of fines being discarded.

This catalyst was used for cracking 35° A. P. I. Mid-Continent gas oil at temperatures of 925° F. and 1035° F. The space velocities were 1.01 and 0.99, respectively. The duration of the runs was 5 hours. The following results were obtained:

| | | |
|---|---|---|
| Gasoline, 400° F. end point_____percent__ | 19.7 | 29.7 |
| Gas_____weight percent__ | 3.4 | 12.2 |
| Carbon_____percent__ | 0.21 | 0.48 |
| Specific gravity of gas_____ | 0.78 | |
| Knock rating of gasoline, A. S. T. M_____ | | 80.5 |

Having thus described our invention, what we claim is:

1. The process of converting hydrocarbon oils into gasoline motor fuels of high knock rating which comprises subjecting the vapors thereof at a temperature of about 700 to 1100° F. to the action of a solid, siliceous conversion catalyst prepared by disintegrating and dissolving with an acid a water-insoluble silicate containing about 20 to 50% $SiO_2$, sufficient basic constituents to render the silicate soluble in said acid, and a catalytically activating metal, coagulating and drying the disintegration product of said silicate to produce the desired conversion catalyst.

2. The process of claim 1 wherein the catalytically activating metal is aluminum.

3. The process of claim 1 wherein the catalytically activating metal is present in the water-insoluble silicate in the proportion of at least 1%.

4. The process of claim 1 wherein the catalytically activating metal is present in the water-insoluble silicate in the proportion of about 1% to 20%.

5. The process of claim 8 wherein the acid employed is hydrochloric acid.

6. The process of claim 8 wherein the acid employed is sulfuric acid.

7. The process of claim 8 wherein the acid employed is phosphoric acid.

8. The process of converting hydrocarbon oils into gasoline motor fuels of high knock rating which comprises subjecting the vapors thereof at a temperature of about 700 to 1100° F. to the action of a solid conversion catalyst prepared by dissolving in a strong acid a water-insoluble alkaline earth metal silicate containing not more than 64% $SiO_2$, sufficient alkaline earth metal to render it soluble in said acid and a lesser amount of a catalytically activating metal from groups III, IV, V, VI and VIII of the periodic system, adjusting the water content of said solution to provide a coagulum of satisfactory physical strength, allowing said solution to coagulate and evaporating the water from the desired solid catalyst product.

9. The process of claim 8 wherein the alkaline earth metal is calcium.

10. The process of claim 8 wherein the alkaline earth metal is magnesium.

11. The process of converting hydrocarbon oils into gasoline motor fuels of high knock rating which comprises subjecting the vapors of said oils at conversion temperature to the action of a hydrocarbon conversion catalyst prepared by subjecting to the dissolving action of sulfuric acid a water-insoluble silicate containing not more than 55% $SiO_2$, a catalytically activating metal from groups III, IV, V, VI and VIII of the periodic system and at least 5% of calcium, converting the calcium to calcium sulfate and the silica to silica hydrogel in intimate association with said calcium sulfate and catalytically activating metal, washing the excess sulfuric acid and soluble salts from said hydrogel and drying the product.

12. The process of converting hydrocarbon oils into gasoline motor fuels of high knock rating which comprises subjecting the vapors of said oils at conversion temperature to the action of a hydrocarbon conversion catalyst prepared by subjecting to the dissolving action of phosphoric acid a water-insoluble silicate containing not more than 55% $SiO_2$, a catalytically activating metal from groups III, IV, V, VI and VIII of the periodic system and at least 5% of calcium, converting the calcium to calcium phosphate and the silica to silica hydrogel intimately associated with said calcium phosphate and catalytically activating metal, washing the excess phosphoric acid and soluble salts from said hydrogel and drying the product.

13. The process of claim 11 wherein the amount of calcium in said water-insoluble silicate is between about 5% and 40%.

14. The process of converting hydrocarbon oils into gasoline motor fuels of high knock rating which comprises subjecting the vapors of said oils at conversion temperature to the action of a solid, siliceous hydrocarbon conversion catalyst prepared by disintegrating and dissolving with an acid a finely powdered water-insoluble silicate containing not more than 55% $SiO_2$ and an activating metal from groups III, IV, V, VI and VIII of the periodic system, whereby said silicate is substantially completely dissolved in an excess of said acid and said silica is converted into a sol, neutralizing excess acid with a solution of sodium silicate, allowing said sol to coagulate to a gelatinous solid material and washing and drying said material containing active silica and said catalytically activating metal.

15. The process of claim 14 in which the amount of catalytically activating metal in said catalyst is about 0.05 to 10%.

16. The process of converting hydrocarbon oils into gasoline motor fuels of high knock rating which comprises subjecting the vapors of said oils at conversion temperature to the action of a solid, siliceous hydrocarbon conversion catalyst prepared by dissolving in acid a finely powdered water-insoluble silicate containing not more than 55% $SiO_2$ and a catalytically activating metal from groups III, IV, V, VI and VIII of the periodic system, adding a controlled amount of a neutralizing agent and thereby precipitating a portion of said catalytically activating metal from the silicate solution, coagulating said precipitated activating metal and silicate solution and washing and drying the coagulated catalyst product.

17. The process of claim 16 wherein the neutralizing agent is ammonia.

18. The process of claim 16 wherein the neutralizing agent is sodium silicate.

19. The process of claim 16 wherein the neutralizing agent is lime.

20. The process of converting hydrocarbon oils into gasoline motor fuels of high knock rating which comprises subjecting the vapors of said oils at conversion temperature to the action of hydrocarbon conversion catalysts, prepared by disintegrating and dissolving with sulfuric acid a finely divided water-insoluble calcium silicate containing a catalytically activating metal selected from groups III, IV, V, VI and VIII of the periodic system, thereby producing a colloidal solution of silica and suspended calcium sulfate, separating said calcium sulfate from said silica solution, coagulating said solution to produce a hydrated silica having associated therewith said activating metal and finally washing and drying said silica and activating metal.

21. The method of making a hydrocarbon conversion catalyst which comprises fusing together at an elevated temperature a water-insoluble, acid-insoluble silicate containing more than 50% $SiO_2$, sufficient basic material to render it acid-soluble after fusion and a catalytically activating metal, cooling said fused silicate, reducing it to a powder and dissolving the powder in a strong acid, allowing the resulting acid solution to coagulate and form a solid siliceous material, separating and drying the siliceous material containing said catalytically activating metal.

22. The method of claim 21 wherein the dried siliceous material and associated catalytically activating metal is subjected to a washing step and a final drying step.

23. The method of claim 21 wherein additional catalytically activating metal is added to and fused with said silicate.

24. The method of making a hydrocarbon conversion catalyst which comprises fusing a base and a water-insoluble acid-insoluble silicate containing a catalytically activating metal, employing sufficient base to produce a fusion product containing not more than 50% $SiO_2$, cooling the fusion product and reducing it to a powder, subjecting the powder to the action of a strong acid, thereby producing a solution of said silicate and associated catalytically activating metal, allowing said solution to coagulate, separating and drying the siliceous, coagulated product containing said catalytically activating metal.

25. The method of claim 24 wherein said silicate is feldspar.

26. The process of converting hydrocarbon oils into gasoline motor fuels of high knock rating which comprises subjecting the vapors of said oils at conversion temperature to the action of a solid, siliceous hydrocarbon conversion catalyst prepared by partially disintegrating and dissolving by the action of an acid, a water-insoluble silicate containing sufficient basic constituents to render it partially-disintegrable and soluble in said acid and a catalytically activating metal, separating non-disintegrated insoluble material, coagulating the clear sol to form a gel, partially dry the gel, washing the partially dried gel and finally completely drying the washed catalyst.

JOHN A. ANDERSON.
EDMOND L. D'OUVILLE.

CERTIFICATE OF CORRECTION.

Patent No. 2,288,874. July 7, 1942.

JOHN A. ANDERSON, ET AL.

It is hereby certified that error appears in the printed specification of the above numbered patent requiring correction as follows: Page 2, second column, line 60, for "large" read --larger--; page 6, second column, line 33, claim 26, for "dry" read --drying--; and that the said Letters Patent should be read with this correction therein that the same may conform to the record of the case in the Patent Office.

Signed and sealed this 25th day of August, A. D. 1942.

(Seal)

Henry Van Arsdale,
Acting Commissioner of Patents.